US009778040B1

(12) United States Patent
Iascone et al.

(10) Patent No.: US 9,778,040 B1
(45) Date of Patent: Oct. 3, 2017

(54) SYSTEMS AND METHODS TO REDUCE SENSOR BIAS

(71) Applicant: Maxim Integrated Products, Inc., San Jose, CA (US)

(72) Inventors: Carmine Iascone, Arluno (IT); Ivo Binda, Voghera (IT); Gabriele Cazzaniga, Rosate (IT); Igino Padovani, Novate Milanese (IT)

(73) Assignee: Hanking Electronics, Ltd., Solon, OH (US)

( * ) Notice: Subject to any disclaimer, the term of this patent is extended or adjusted under 35 U.S.C. 154(b) by 841 days.

(21) Appl. No.: 14/093,909

(22) Filed: Dec. 2, 2013

Related U.S. Application Data (60) Provisional application No. 61/859,595, filed on Jul. 29, 2013.

(51) Int. Cl.
  *G01C 19/5776* (2012.01)
  *G01P 21/00* (2006.01)
  *G01C 19/00* (2013.01)

(52) U.S. Cl.
  CPC ......... *G01C 19/5776* (2013.01); *G01C 19/00* (2013.01); *G01P 21/00* (2013.01)

(58) Field of Classification Search
  None
  See application file for complete search history.

(56) References Cited

U.S. PATENT DOCUMENTS

| | | | | |
|---|---|---|---|---|
| 6,215,115 | B1* | 4/2001 | Baker | G01S 3/7864 250/214 C |
| 7,587,277 | B1* | 9/2009 | Wells | G01C 21/165 701/510 |
| 8,241,223 | B2* | 8/2012 | Gavriely | A61B 5/053 327/40 |
| 2004/0189315 | A1* | 9/2004 | Muratov | G01R 19/0092 324/500 |
| 2010/0152600 | A1* | 6/2010 | Droitcour | A61B 5/05 600/534 |
| 2010/0329583 | A1* | 12/2010 | Whiteside | G06T 5/002 382/260 |
| 2011/0007168 | A1* | 1/2011 | Nagara | H04N 5/775 348/193 |
| 2012/0146819 | A1* | 6/2012 | Silva | G01R 19/02 341/110 |
| 2012/0323520 | A1* | 12/2012 | Keal | G01C 19/5776 702/141 |
| 2013/0282326 | A1* | 10/2013 | Kim | G01P 15/18 702/142 |

\* cited by examiner

*Primary Examiner* — Alexander Satanovsky
*Assistant Examiner* — Brent A Fairbanks
(74) *Attorney, Agent, or Firm* — Hartman Global IP Law; Gary M. Hartman; Domenica N.S. Hartman (57) ABSTRACT

Various embodiments of the invention provide for automatic, real-time bias detection and error compensation in inertial MEMS sensors often used in handheld devices. Real-time bias correction provides for computational advantages that lead to optimized gyroscope performance without negatively affecting user experience. In various embodiments, bias non-idealities are compensated by utilizing raw output data from the gyroscope itself without relying on additional external sensors.

11 Claims, 7 Drawing Sheets

SYSTEMS AND METHODS TO REDUCE SENSOR BIAS

CROSS REFERENCE TO RELATED PATENT APPLICATIONS

The present application claims priority to U.S. Provisional Application No. 61/859,595 titled "Systems and Methods to Reduce Sensor Bias," filed Jun. 29, 2013, by Carmine Iascone, Ivo Binda, Gabriele Cazzaniga, and Igino Padovani, which application is hereby incorporated herein by reference in its entirety.

BACKGROUND

A. Technical Field

The present invention relates to sensors and, more particularly, to systems, devices, and methods of automatically compensating bias errors in MEMS sensors.

B. Background of the Invention

Low-cost inertial MEMS sensors, such angular rate sensors, play an increasingly important role in the consumer electronics market. A gyroscope sensor is an angular rate sensor that determines angular velocity by measuring angular variation. Gyroscopes are used in many applications, including touchless user interface applications, that track the orientation of the device the sensor is mounted on. Orientation information is typically derived from a time integral of the output signal of the gyroscope.

Unfortunately, some angular rate sensors, such as MEMS gyroscope sensors are known to suffer from numerous non-idealities, including thermal hysteresis and manifestations of other temperature dependencies. The most critical non-ideality, however, is the presence of an unwanted offset signal, also known as zero rate level, at the output of the angular rate sensor. This offset signal is typically a bias signal that exists even at conditions where the sensor is in a steady state condition without being exposed to any external forces besides gravity. The presence of such a bias signal makes it difficult to distinguish between a relatively slow and constant actual motion that the sensor undergoes and a parasitic bias signal. This unwanted signal causes an integration error in that the integral of the sensor output signal diverges over time and causes a cumulative bias or drift error that steadily increases with use. Unless compensated for, such bias errors compromise the sensing accuracy and, ultimately, the usefulness of the sensor as a motion and orientation tracking device.

Existing approaches that seek to eliminate bias errors in MEMS gyroscope sensors typically rely on information provided by one or more auxiliary sensors, e.g., accelerometers and a magnetometers. In some existing approaches, bias compensation is based on algorithms that utilize a sensor fusion process to fuse, for example, a gyroscope output signal with a magnetometer signal and an accelerometer signal employing Kalman or complementary filtering methods. Other approaches relate to a priori measurement and calibration of the sensor bias accounting for certain external conditions. However, these indirect approaches are rather computationally complex and require dedicated processing capabilities. What is needed are tools for system designers to overcome the above-described limitations.

SUMMARY OF THE INVENTION

Various embodiments of the invention provide for detection and elimination of bias errors in inertial MEMS sensors. In applications such as orientation tracking, this increases the sensor's accuracy of angular rate calculations. In various embodiments, bias non-idealities are compensated by utilizing raw output data from a gyroscope without relying on additional external sensors.

In certain embodiments of the invention, bias non-idealities are compensated by evaluating raw sensor data to determine whether the sensor is in a condition of zero motion. Detection of a no-motion condition allows for the estimation of a bias value and, ultimately, for the correction or compensation of bias errors. This may be accomplished, for example, by filtering and subtracting the bias signal so as to remove the bias offset.

In some embodiments, the no-motion condition of a gyroscope sensor is detected through a no-motion detection circuit, which analyzes information that is contained in the output data of the gyroscope. Analysis by the no-motion detector comprises the observation of RMS values of the output data, which then can be compared to a threshold level in order to make a determination whether the gyroscope is in a steady-state condition. In some embodiments, analysis comprises extracting information from the spectral power density or the calculated variance of the gyroscope output data.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that this is not intended to limit the scope of the invention to these particular embodiments.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention.

Although this document generally discusses digital elements, analog circuit components may equally be utilized to implement the various embodiments of the invention without deviating from the scope of the present invention.

Figure 1:
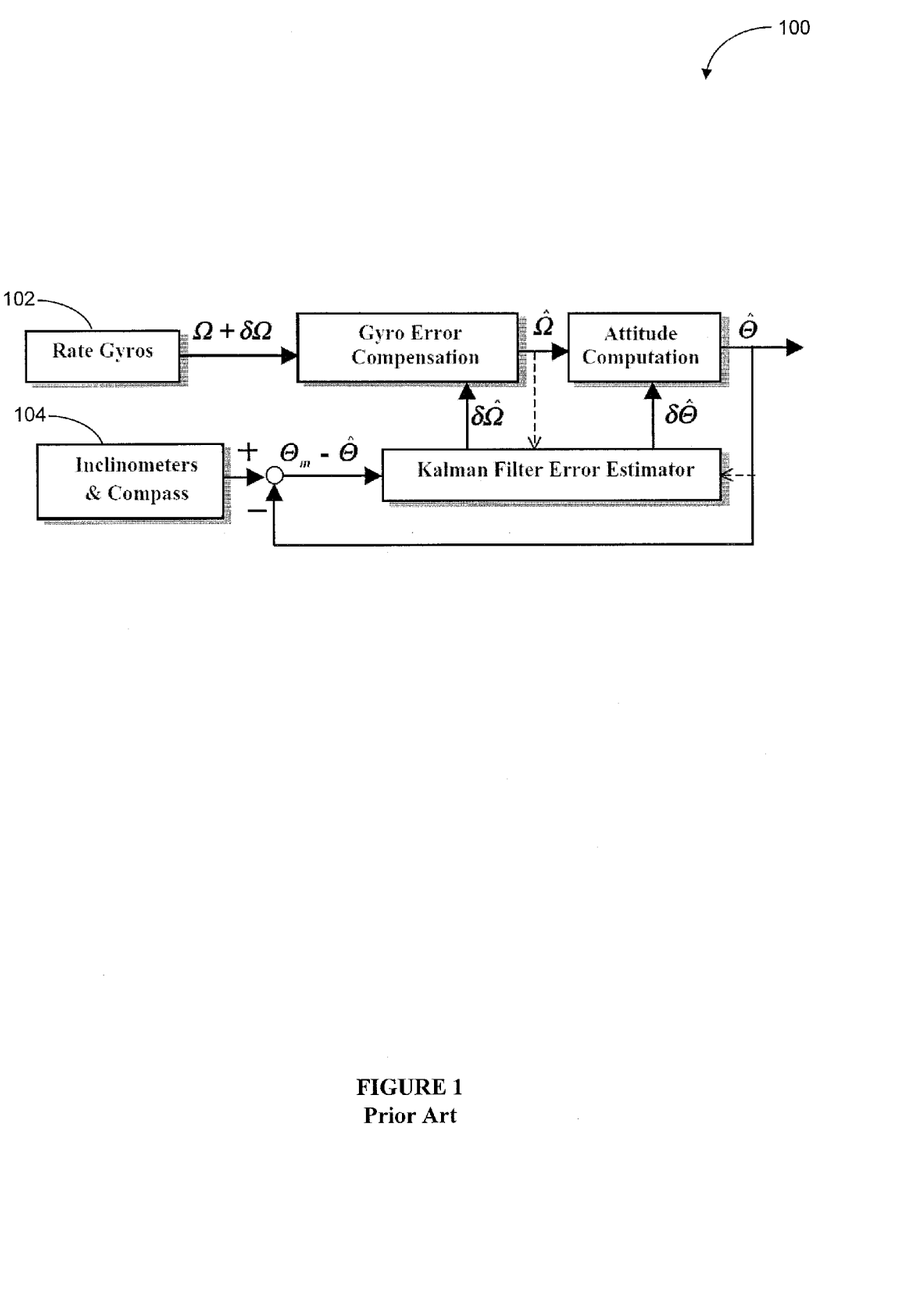
FIG. 1 shows a prior art approach to reduce sensor bias utilizing a Kalman filter.

FIG. 1 shows a prior art approach to reduce sensor bias utilizing a Kalman filter. In this example, Kalman filter 100 is used to estimate orientation of a moving object. In particular, Kalman filter 100 derives attitude by way of integration of rigid body kinematic equations, starting from a known initial orientation. Gyroscopes 102 used in Kalman filter 100, as all gyroscopes, suffer from a time varying drift error. Drift error is a low frequency noise component that due to its cumulative nature is the largest source of error when compared to merely additive gyroscope noise. Inclinometers 104 relate the body orientation to the gravity vector in order to provide an absolute reference value for attitude, which makes inclinometers generally suitable for use as tilt sensors or magnetic compasses. By combining various sensors 102, 104 their drawbacks can be overcome and accuracy can be improved. However, the use of multiple independent sensors 102, 104 comes at a price. Since Kalman filter 100 is a recursive filtering algorithm, the computation required to solve its equations significantly increases when large vectors and matrices are involved that introduce numerical inaccuracies.

Therefore, it would be desirable to have systems and methods to autonomously compensate time varying sensor bias errors without the need to employ multiple sensors, and without the need for extensive computational efforts and processing power.

Figure 2A:
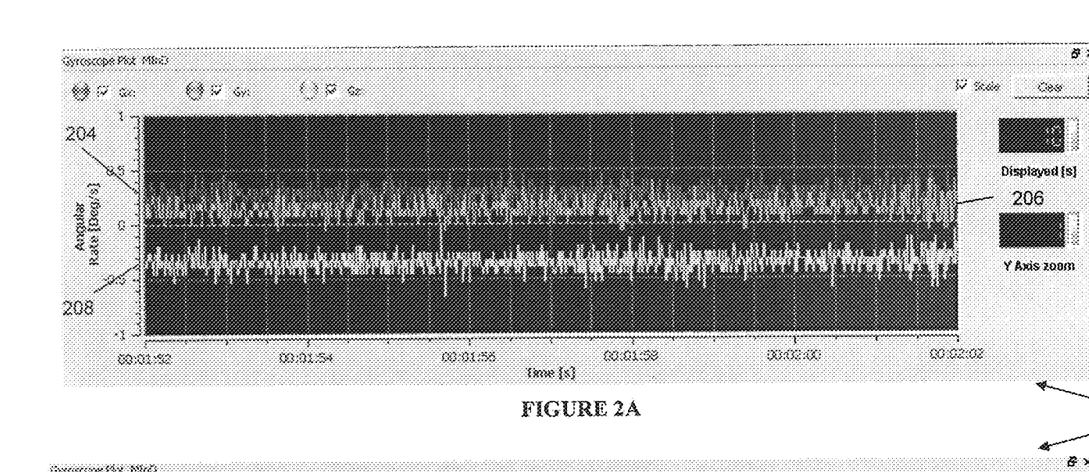
FIG. 2A illustrates typical output signals of a motionless three-axis gyroscope sensor according to various embodiments of the invention.

FIG. 2A illustrates typical angular rate output signals 204-208 of a motionless three-axis gyroscope sensor. Shown output signals 204-208 for each of the three sensor axes when the sensor experiences no motion. Although no forces are applied to the gyroscope sensor (e.g., because the sensor is placed on a table), each output signal in FIG. 2A has, in addition to variations caused by noise, an offset value associated with it. As previously described, in order to achieve device stability, however, offset values should be compensated for or removed from the gyroscope output signal 204-208.

In one embodiment, output signals 204-208 are analyzed by calculating or estimating RMS values for each axis. The thereby obtained RMS values can then be compared to a predetermined threshold value in order to determine whether the gyroscope sensor is indeed in a motionless state. If it is found that all three output signals 204-208 are below their threshold value, it can be concluded that the actual angular speed experienced by the gyroscope sensor is zero, and that output signals 204-208 indicate a motionless condition.

This implies that in this condition an average output signal 204-208 of the gyroscope sensor that is different from zero is, therefore, caused by one or more bias non-idealities. From the presence of a motionless condition, a bias signal or offset can then be easily identified for output signal 204-208. Once the value of the offset is known, it can be compensated, for example, by subtracting it from the sensor data in order to remove the offset, as will be described further below.

Figure 2B:
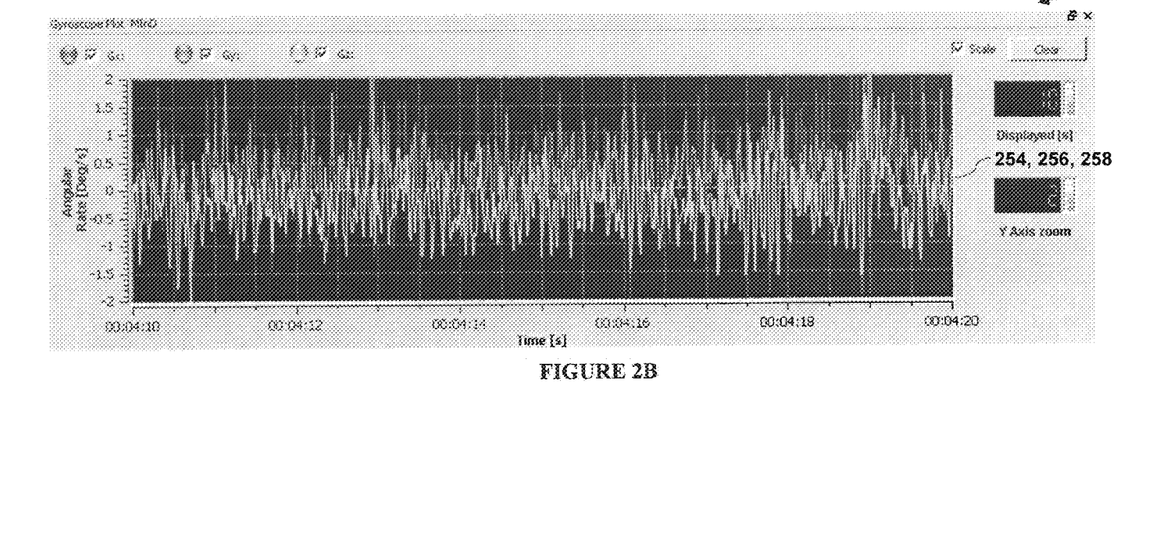
FIG. 2B illustrates typical output signals of the three-axis gyroscope sensor in FIG. 2A when the sensor is held still in a person's hand.

FIG. 2B illustrates typical angular rate sensor output signals 254-258 of the three-axis gyroscope sensor in FIG. 2A when the sensor is held still in a person's hand. As shown in FIG. 2B, the RMS levels for all three output signals 254-258 rise above the level shown for the condition in FIG. 2A indicating a noisier signal that is caused by external rotational forces that now act on the sensor and cause some amount of detectable motion. As a result, by observing and evaluating angular rate sensor output signals 254-258 that were obtained under different conditions than output signals 204-208, can thus be distinguished from the motionless condition in FIG. 2A.

It is readily apparent to one skilled in the art that an angular rate sensor with a higher signal-to-noise ratio is more likely to correctly detect and distinguish between a variance that is caused by a bias signal rather than a variance that is caused by a noise signal. In other words, sensors with higher signal-to-noise ratio is more likely to detect small movements than a sensor with a relatively lower noise performance.

Figure 3:
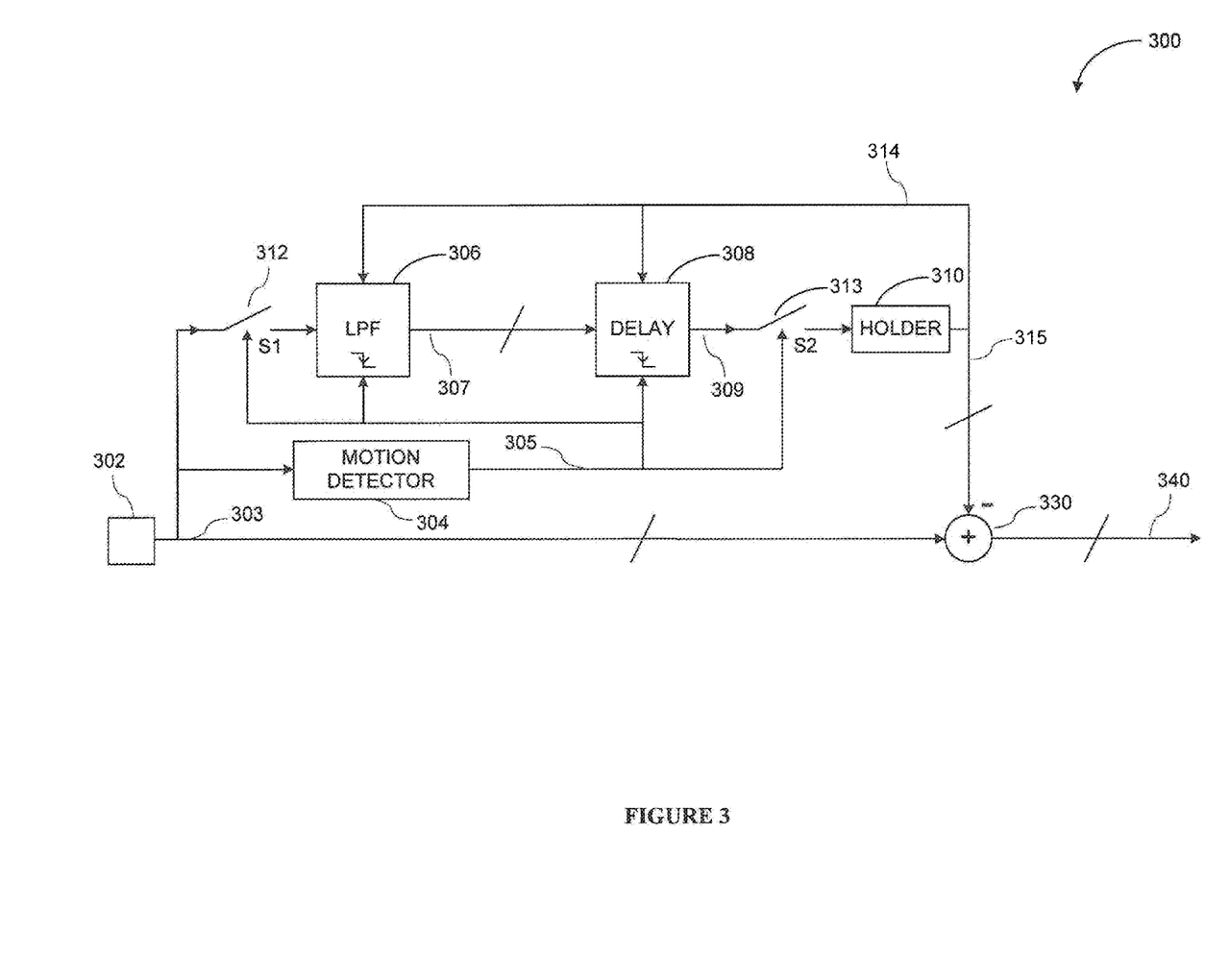
FIG. 3 illustrates an exemplary block diagram of a system to reduce sensor bias according to various embodiments of the invention.

FIG. 3 illustrates an exemplary block diagram of a system to reduce sensor bias according to various embodiments of the invention. System 300 comprises angular rate sensor 302, motion detector 304, low-pass filter 306, delay module 308, holder 310, switches —312, 313, and summing element 330. Sensor 302 is, for example, a gyroscope sensor that provides data 303 to motion detector 304, low-pass filter 306, and summing element 330. Motion detector 304 generates detection signal 305 that controls low-pass filter 306, delay module 308, and switch 312. In the example, in FIG. 3, low-pass filter 306 is coupled between switch 312 and delay module 308, and holder 308 is coupled between switch 313 and summing element 330.

In operation, sensor 302 is configured to detect mechanical motion in response to being exposed to an internal or external force. Motion detector 304 receives data 303 from sensor 302, estimates an RMS value therefrom and, in response, generates detection signal 305. Motion detector 304 evaluates data 303, detects whether sensor 302 is in a motionless condition, and generates detection signal 305. Implementations of detector 304 are presented in FIGS. 5 and 6 and described below. Detection signal 305, e.g. a trigger signal, controls switches 312, 313 that are activated in tandem to indicate whether detector 304 detected a motionless condition.

Low-pass filter 306, which may be implemented by any digital filter known in the art, receives raw data signal 303 from sensor 302 and estimates therefrom one or more bias values 307. In one embodiment, low-pass filter 306 is configured to have a cut-off frequency that may be determined by an application-dependent resolution of estimated bias value 307. Delay module 308 may be a programmable delay module comprising a memory device (not shown), and may be implemented, for example, as a pipeline or digital timer.

In one embodiment, delay module 308 receives from motion detector 304 detection signal 305, which may act as a reset signal that sets a memory device of low-pass filter 306 to a pre-defined reset value. Delay module 308 applies a delay to bias values estimate 307 to generate a corrected bias estimate 309 that is then forwarded to holder 310. The value of corrected bias estimate 309 can then be subtracted from data 303 in order to generate a corrected sensor output signal 340.

The amount of delay generated by delay module 308 may correlate with the settling time of low-pass filter 306. The delay ensures that low-pass filter 306 is settled after being triggered by motion detector 304 before holder 310 receives corrected bias estimate 309. In this manner, older values that may linger in the memory of digital low-pass filter 306 are not used when performing the bias compensation.

Once motion detector 304 detects a motion condition and detection signal 305 changes state, switch 313 is opened and holder 310 applies information regarding the most recent corrected bias estimate 309 to summing element 330. The most recent valid compensation value 314 is also fed back (e.g., as an initial condition) to low-pass filter 306 and delay module 308, until motion detector 304 detects that sensor 302 is, again, motionless.

Holder 310 may be implemented as a digital register or a switched capacitor circuit that is configured to maintain a voltage in the analog domain. In one embodiment, holder 310 outputs a digital word 315 that comprises corrected bias estimate 309 that is used by summing element 330 to subtract it from data 303. Summing element 330 is any device capable of subtracting corrected bias estimate 309 from sensor data 303.

It is noted that system 300 may be embedded within sensor 302, e.g., a gyroscope sensor; implemented inside an ASIC; or implemented as a software solution. A person of skill in the art will appreciate that system parameters for system 300 may be chosen to meet requirements of sensor 302 and tailored to actual RMS signals present in a given environment.

Figure 4:
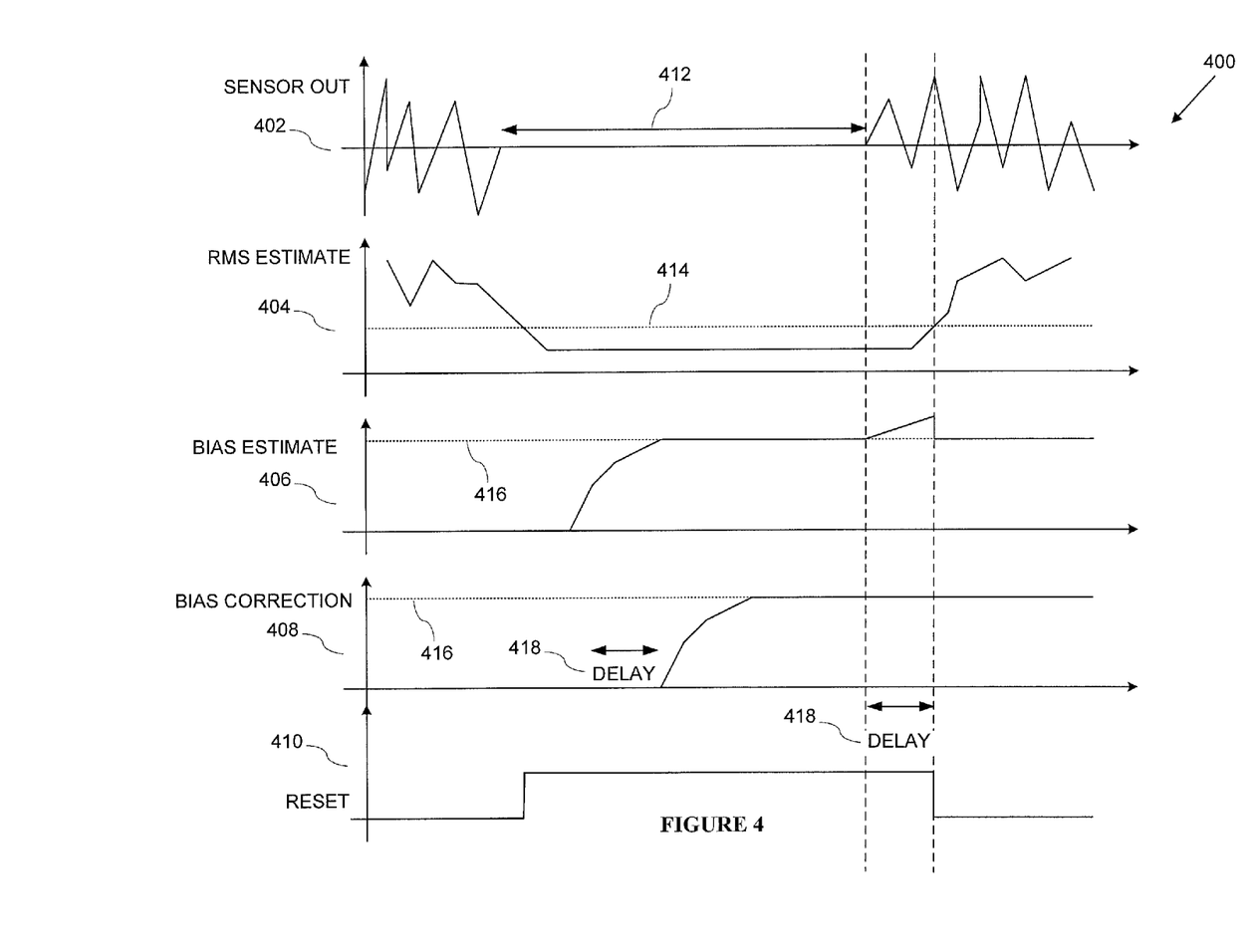
FIG. 4 illustrates an exemplary timing diagram for a system to reduce sensor bias as in FIG. 3, according to various embodiments of the invention.

FIG. 4 illustrates an exemplary timing diagram 400 for a system to reduce sensor bias as in FIG. 3, according to various embodiments of the invention. Depicted in FIG. 4 are signals for sensor output signal 402, RMS estimate signal 404, bias estimate signal 406, bias correction signal 408, and reset signal 410. Sensor output signal 402 is a raw data signal that indicates whether the sensor is in motion or enters a motionless steady state condition 412.

RMS estimate signal 404 represents an estimated RMS value based on sensor output signal 402. Dotted line 414 indicates a threshold value that signal 404 typically exceeds when the sensor is in motion. Once sensor is motionless 412, RMS estimate signal 404 falls below threshold value 414 determined by the inherent noise level of the sensor. RMS estimate signal 404 remains below threshold value 414 until the sensor, again, is set in motion and outputs a detectable signal 402 in response to the movement, such that the value of RMS estimate signal 404 rises above threshold value 414.

Delay time 418 is the time between the moment the sensor detects the movement and the time RMS estimate signal 404 crosses threshold value 414 in response. During this timeframe, the low-pass filter uses sensor output signal 402 to increment bias estimate signal 406. As a result, bias estimate signal 406 rises above actual sensor bias level 416, i.e., the estimated bias will be overestimated.

Bias correction signal 408 has the same behavior as bias estimate signal 406, except that bias correction signal 408 has built-in delay 418 that prevents bias correction signal 408 from rising above actual sensor bias level 416 and applying the wrong bias correction to sensor output signal 402. In this manner, delay 418 removes unwanted effects, such as the effect of the settling time of the low-pass filter.

In one embodiment, reset signal 410 is controlled by the motion detector to switch from a low state to a high state to activate one or more reset switches and enable bias estimation or triggers a compensation update in response to detecting a no motion condition.

As shown in FIG. 4, reset signal 410 aligns with RMS estimate signal 404 crossing threshold 414. For example, when RMS estimate signal 404 falls below threshold 414, the motion detector may revert reset signal 410 to its low state, thereby, deactivating the reset switches and disabling the bias compensation process. As is shown, the crossing of threshold 414 is preceded by delay time 418, e.g., the settling time of the motion detector during which the bias estimation would otherwise deliver incorrect values.

Figure 5:
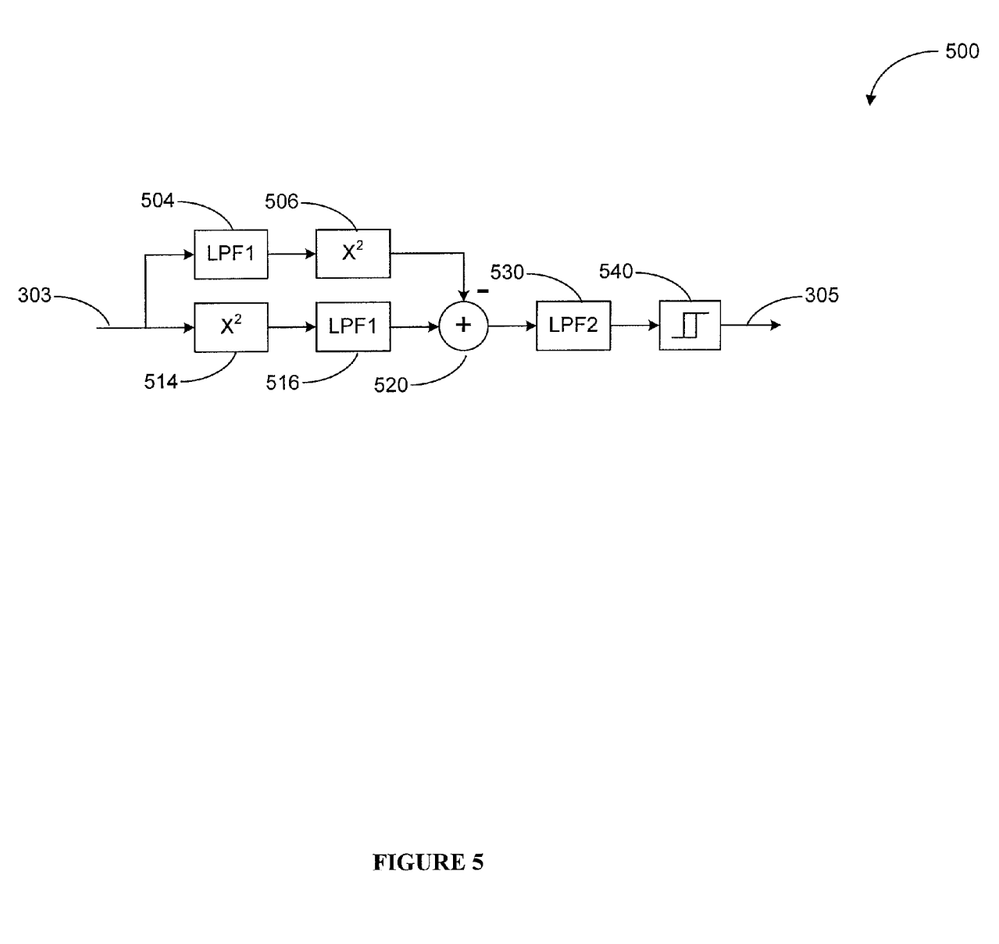
FIG. 5 illustrates a block diagram of an exemplary implementation of a motion detection circuit utilizing RMS direct estimation according to various embodiments of the invention.

FIG. 5 illustrates a block diagram of an exemplary implementation of a motion detection circuit utilizing RMS direct estimation according to various embodiments of the invention. Detection circuit 500 comprises multiple paths; a first path that comprises low-pass filter 1 504 and squarer 506; a second path that comprises low-pass filter 1 516 and squarer 514; and a third path that comprises low-pass filter 2 530 and threshold detector 540. The first two paths merge in summing circuit 520, which combines the two paths and outputs the result to low-pass filter 2 530.

In one embodiment, low-pass filter 1 504, 516 has a programmable bandwidth (e.g., 1 Hz) that covers the bandwidth of data signal 303, e.g., the output signal of a gyroscope sensor as presented in FIG. 2. Low-pass filter 2 530 may be a programmable anti-spike filter that has a greater bandwidth (e.g., 2 Hz) than low-pass filter 1 504, 516. In the example in FIG. 5, threshold detector 540 is implemented as a hysteresis comparator. Squarer 506, 514 is any squarer known in the art.

In operation, in the first path of detection circuit 500, data signal 303 is applied to low-pass filter 504. The output of low-pass filter 504 can be considered an average of data signal 303. Squarer 506 calculates a square value of this averaged signal and forwards it to summing circuit 520. In the second path of detection circuit 500, squarer 514 squares data signal 303, which is then forwarded to low-pass filter 516 to filter the signal. Summing circuit 520 subtracts the filtered and squared data output by the first path from the squared and filtered data by the second path. The output signal of summing circuit 520, which is a measure of the variance of data signal 303, is then filtered by low-pass filter 2 530 in order to eliminate potential signal spikes.

The evaluation of the variance of data signal 303 (i.e., the squared deviation from the mean value of data signal 303) by subtracting the square of its mean value from the mean of its square value, therefore, serves as a simplified way to estimate the RMS value of data signal 303 (i.e., the magnitude of the varying signal in the digital domain).

Threshold detector 540 detects when the output of low-pass filter 2 530 exceeds an upper or lower threshold value and controls the de-bouncing time to ensure that any unfiltered high frequency noise or spike signal that inadvertently passes through low-pass filter 2 530 is properly detected and removed from detection signal 305 (e.g., within a given number of sampling periods). It is noted that a separate circuit may be employed to perform the de-bouncing process. In one embodiment, the output of threshold detector 540 detection signal 305 is a binary signal that indicates whether a motion is detected or not.

Figure 6:
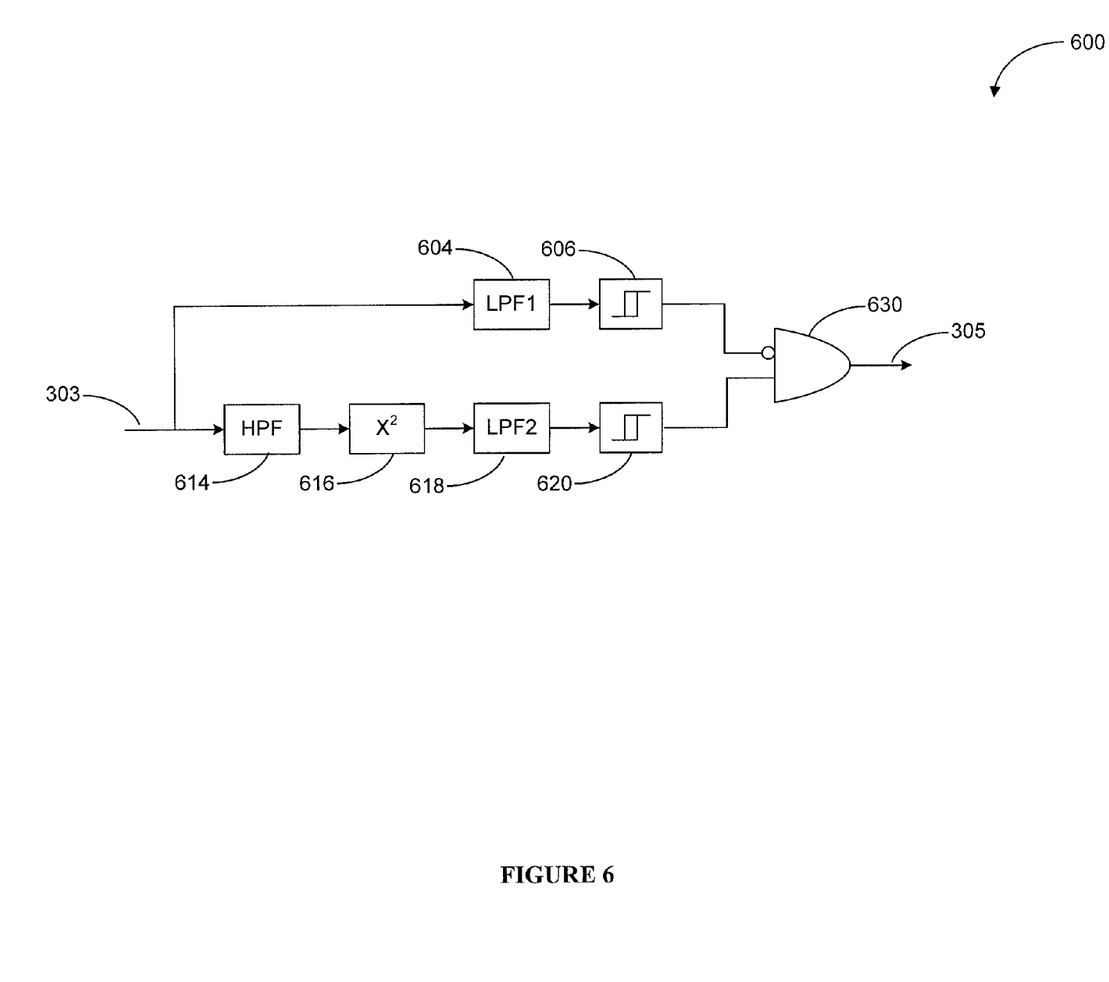
FIG. 6 illustrates a block diagram of an exemplary implementation of a motion detection circuit configured to analyze a high-pass filtered sensor signal, according to various embodiments of the invention.

FIG. 6 illustrates a block diagram of an exemplary implementation of a motion detection circuit configured to analyze a high-pass filtered sensor signal, according to various embodiments of the invention. Motion detection circuit 600 receives data signal 303 and outputs signal 305, which indicates whether a motion is detected or not. As the circuit in FIG. 5, motion detection circuit 600 comprises two paths that independently process data signal 303, which may be a raw data signal generated by a gyroscope sensor. The first path comprises low-pass filter 1 604 and threshold detector 606. The second path comprises high-pass filter 614, squarer 616, low-pass filter 2 618, and threshold detector 2 620. In one embodiment, each threshold detector 606, 620 is a comparator system that is characterized by a hysteresis and de-bouncing time. Gate 630 combines the two paths to generate detection signal 305.

In operation, in the first path, data signal 303 is applied to low-pass filter 604 to average data signal 303. The series configuration of low-pass filter 604 and threshold detector 606 serves to estimate the gyroscope DC signal in order to detect the presence of relatively low frequency rotational signals that may result from a constant sensor movement, and to distinguish such these signals from a stable but noisy system signal. This information is used to prevent motion detection 600 from falsely triggering a detection signal 305 that indicates a no motion condition in situations when the sensor, in fact, detects a constant signal. As a result, detection signal 305 will, ideally, correctly indicate the motion status of the sensor.

In the second path, squarer 616 calculates the signal power in data signal 303 and forwards it to low-pass filter 618, which is an anti-spike low-pass filter that filters the squared signal and serves to eliminate potential high-frequency spike signals. Low-pass filter 618 forwards the squared and filtered signal to threshold detector 620. Threshold detector 620 triggers the bias update once the signal power falls below a specified threshold level. The output of threshold detector 606, 620 is fed into gate 630, which changes into a high state when signal 303 processed by the two paths is an actual bias signal rather than a constant rotation signal. As a result, motion detection circuit 600 ideally only detects true no-motion conditions that are present at the sensor and, thereby, prevents erroneous updates to the sensor bias signal in response to constant rotation signals. It is noted that in most cases, the second path alone would be sufficient, for example, to estimate the RMS activity on a gyroscope output, but slow rotational signals applied to the gyroscope may be missed.

Figure 7:
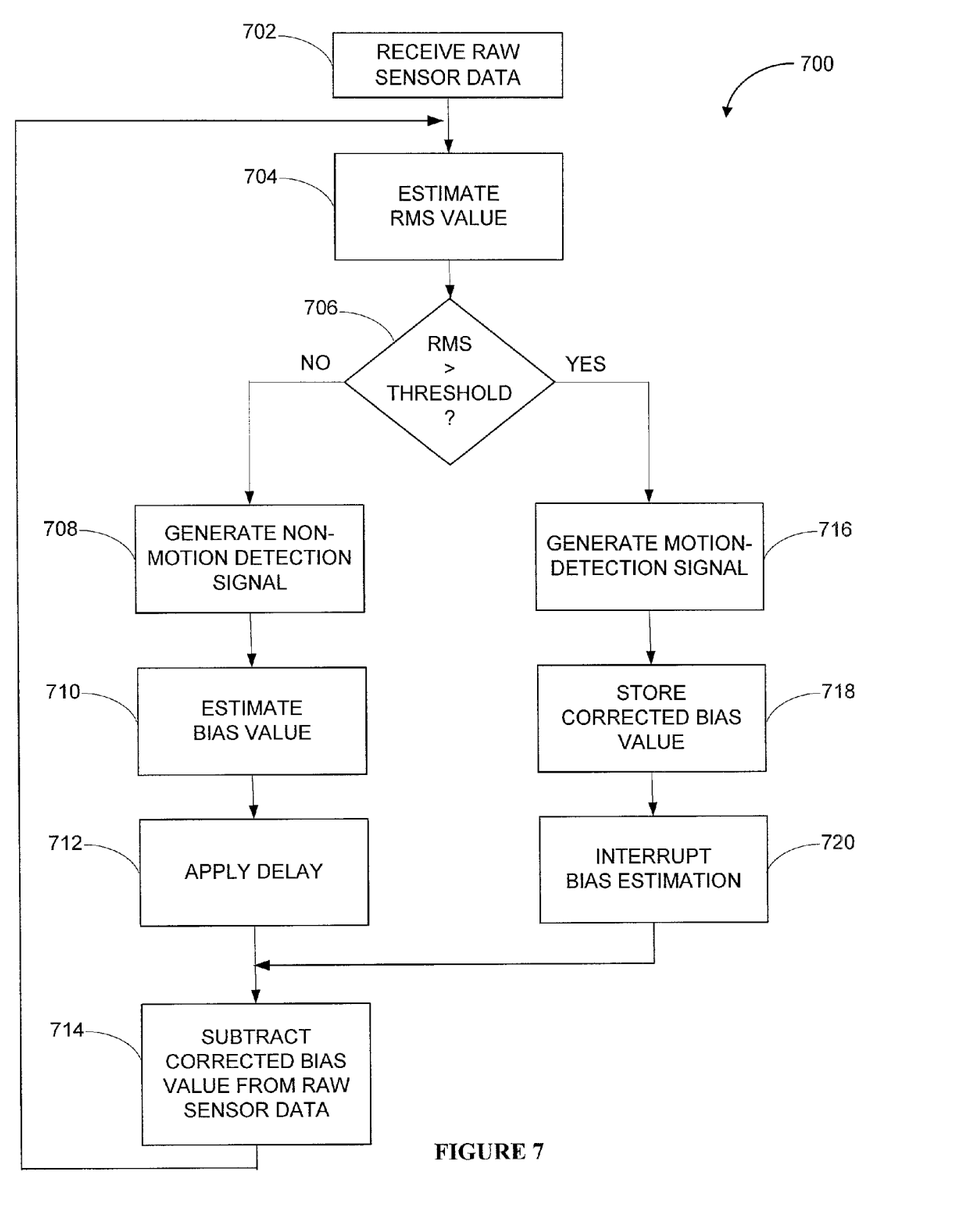
FIG. 7 is a flowchart of an illustrative process for reducing sensor bias, in accordance with various embodiments of the invention.

FIG. 7 is a flowchart of an illustrative process for reducing sensor bias, in accordance with various embodiments of the invention. The process for reducing sensor bias 700 begins at step 702 when raw data is received, for example from a MEMS gyroscope sensor.

At step 704 an RMS value is estimated, for example, by a motion detector.

At step 706, the estimated RMS value is compared with a threshold value of a threshold detector, for example, a hysteresis comparator.

If the estimated RMS value lies below the threshold value then, at step 708, a non-motion detection signal is generated.

At step 710, in response to the motion condition signal, a bias value is estimated, for example, from an RMS value of the raw data.

At step 712, a delay is applied to the estimated bias value to generate a corrected bias value.

At step 714, the corrected bias value is subtracted from the raw data and the process for reducing sensor bias 700 returns to receiving raw data.

If, however, at step 706, the RMS value lies above the threshold value then, at step 716, a motion detection signal is generated.

At step 718, the corrected bias value is stored, for example, in a digital memory device.

At step 720, the RMS value determination is interrupted and the process for reducing sensor bias 700 resumes with step 714 and subtracting the corrected bias value from the raw data.

In one embodiment, the process for stabilizing further comprises the steps of energizing a front-end amplifier. In another embodiment, the process further comprises energizing and de-energizing a bias control circuit.

It will be appreciated by those skilled in the art that fewer or additional steps may be incorporated with the steps illustrated herein without departing from the scope of the invention. No particular order is implied by the arrangement of blocks within the flowchart or the description herein.

It will be further appreciated that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art, upon a reading of the specification and a study of the drawings, are included within the scope of the present invention. It is therefore intended that the claims include all such modifications, permutations, and equivalents as fall within the true spirit and scope of the present invention.

We claim:

1. A system that automatically compensates bias errors in output data of a MEMS gyroscope sensor, the system comprising:
   a motion detection circuit coupled to receive the output data of the MEMS gyroscope sensor, the motion detection circuit generates a no-motion detection signal in response to determining a no-motion condition of the MEMS gyroscope sensor;
   a low-pass filter coupled to receive the no-motion detection signal, the low-pass filter generates an estimated bias value;
   a delay module coupled to both the low-pass filter and the motion detection circuit, in response to receiving the no-motion detection signal, the delay module generates a corrected bias value from the estimated bias value;
   a holder selectively coupled to the delay module, the holder selectively receives the corrected bias value from the delay module and generates a summing signal; and
   a summing element coupled to the holder and the output data, the summing element is coupled to receive the output data of the MEMS gyroscope sensor and the summing signal from the holder and subtract the corrected bias value from the output data to generate a corrected sensor output signal;
   wherein the motion detection circuit comprises:
   a first low-pass filter coupled to receive a first input signal, the low-pass filter generates a first filtered output signal;

a first squarer coupled to the first low-pass filter, the first squarer generates a first squared signal from the first filtered output signal;

a second squarer coupled to receive the first input signal, the second squarer generates a second squared signal from the first input signal;

a second low-pass filter coupled to the second squarer, the second low-pass filter generates a second filtered output signal from the second squared signal;

a summing circuit coupled to receive the first squared signal and the second filtered output signal to generate a second input signal;

a third low-pass filter coupled to the summing circuit, the third low-pass filter is configured to generate a detection signal; and a threshold detector configured to detect when the detection signal exceeds a predetermined value.

2. The system according to claim 1, further comprising a first switch coupled to the lowpass filter and a second switch coupled to the holder, the first and second switches are responsive to the no-motion detection signal.

3. The system according to claim 2, wherein the no-motion detection signal is a reset signal that controls the first and second switches.

4. The system according to claim 1, wherein the low-pass filter is a digital filter comprising a resettable memory.

5. The system according to claim 1, wherein the holder is one of a digital register and a switched capacitor circuit configured to maintain a voltage in the analog domain.

6. The system according to claim 1, wherein the delay module is programmable.

7. The system according to claim 1, wherein the delay module is adjusted in a manner such that the corrected bias value is generated after the low-pass filter has settled.

8. The system according to claim 1, wherein the threshold detector controls a de-bouncing time in a manner so as to remove high-frequency noise signals from the detection signal.

9. The system according to claim 1, wherein the second low-pass filter is a programmable anti-spike filter that comprises a greater bandwidth than the first low-pass filter.

10. The system according to claim 1, wherein at least one of the first and second low-pass filters comprise a programmable bandwidth.

11. The system according to claim 1, wherein the threshold detector comprises a hysteresis comparator.

* * * * *